(12) United States Patent
Yvain et al.

(10) Patent No.: US 10,502,255 B2
(45) Date of Patent: Dec. 10, 2019

(54) DEFORMABLE SCREW ASSEMBLY

(71) Applicant: CENTRE TECHNIQUE DES INDUSTRIES MECANIQUES, Senlis (FR)

(72) Inventors: Etienne Yvain, Chantilly (FR); Christophe Delcher, Fraisses (FR)

(73) Assignee: CENTRE TECHNIQUE DES INDUSTRIES MECANIQUES, Senlis (FR)

( * ) Notice: Subject to any disclaimer, the term of this patent is extended or adjusted under 35 U.S.C. 154(b) by 147 days.

(21) Appl. No.: 15/566,192

(22) PCT Filed: Apr. 15, 2016

(86) PCT No.: PCT/FR2016/050885
§ 371 (c)(1),
(2) Date: Oct. 12, 2017

(87) PCT Pub. No.: WO2016/166492
PCT Pub. Date: Oct. 20, 2016

(65) Prior Publication Data
US 2018/0135687 A1    May 17, 2018

(30) Foreign Application Priority Data
Apr. 17, 2015 (FR) .................................. 15 53427

(51) Int. Cl.
*F16B 43/00*    (2006.01)
*F16B 31/02*    (2006.01)

(52) U.S. Cl.
CPC ............ *F16B 43/00* (2013.01); *F16B 31/028* (2013.01)

(58) Field of Classification Search
CPC ...... F16B 31/028; F16B 33/004; F16B 43/00; F16B 43/001
(Continued)

(56) References Cited

U.S. PATENT DOCUMENTS 2,713,482 A * 7/1955 Stapleton ................ F16B 43/00
267/162
3,009,722 A * 11/1961 Augustin .............. F16B 43/001
277/637

(Continued)

FOREIGN PATENT DOCUMENTS

FR    2421300 A1    10/1979

OTHER PUBLICATIONS

International Search Report for PCT/FR2016/050885 dated Jul. 19, 2016.

*Primary Examiner* — Roberta S Delisle
(74) *Attorney, Agent, or Firm* — Merchant & Gould P.C.

(57) ABSTRACT

A screw assembly includes a longitudinal component (10) having two opposite ends and a threaded part (12; 42; 66) so that it can be connected by screwing to one of two elements (34). An elastically deformable member (18, 20; 48; 82) is adapted to be borne, in the axially compressed state, between one or other of the two opposite ends of the longitudinal component (10) and the other of the two elements. The assembly has a retaining device (30; 54; 84) so as to be able to keep the elastically deformable member (18, 20; 48; 82) in compression and so as to be able to release the elastically deformable member in the compressed state between the other of the two elements (32) and the one or the other of the two opposite ends.

8 Claims, 4 Drawing Sheets

(58) Field of Classification Search
USPC .................................. 411/531, 541, 542, 544
See application file for complete search history.

(56) References Cited

U.S. PATENT DOCUMENTS

| | | | | |
|---|---|---|---|---|
| 3,170,701 | A * | 2/1965 | Hoover | F16B 43/001 |
| | | | | 277/637 |
| 3,259,404 | A * | 7/1966 | Papenguth | F16B 33/004 |
| | | | | 277/637 |
| 3,426,819 | A | 2/1969 | Estes et al. | |
| 4,191,389 | A * | 3/1980 | Jelinek | F16B 43/001 |
| | | | | 277/637 |
| 4,443,145 | A * | 4/1984 | Peschges | F16B 43/001 |
| | | | | 411/369 |
| 4,702,657 | A * | 10/1987 | Jelinek | F16J 15/00 |
| | | | | 411/369 |
| 5,165,882 | A * | 11/1992 | Shimizu | F04B 39/121 |
| | | | | 411/136 |
| 5,209,596 | A * | 5/1993 | Matczak | F16C 11/0614 |
| | | | | 403/134 |
| 5,496,142 | A * | 3/1996 | Fodor | F16B 43/004 |
| | | | | 411/156 |
| 8,616,818 | B2 * | 12/2013 | Travis | F16B 43/00 |
| | | | | 411/371.1 |
| 2002/0066246 | A1 | 6/2002 | Leek | |
| 2006/0133912 | A1 | 6/2006 | Commins | |
| 2006/0156657 | A1 | 7/2006 | Commins | |
| 2007/0157736 | A1 | 7/2007 | Kawano et al. | |
| 2013/0034403 | A1 * | 2/2013 | Lan | F16B 33/004 |
| | | | | 411/371.1 |

* cited by examiner

DEFORMABLE SCREW ASSEMBLY

This application is a National Stage Application of PCT/FR2016/050885, filed 15 Apr. 2016, which claims benefit of French Patent Application No. 1553427, filed 17 Apr. 2015 and which applications are incorporated herein by reference. To the extent appropriate, a claim of priority is made to each of the above disclosed applications.

BACKGROUND OF THE INVENTION

The present invention relates to a deformable screw assembly making it possible to apply load between two elements in two opposite directions to one another.

One envisioned field of application is, in particular although not exclusively, that of the assembly of two elements.

SUMMARY OF THE INVENTION

It is known practice to assemble two holed components using a screw and a nut and to interpose an elastic washer between the nut and one of the two components. The screw has a head and a threaded shank and, thanks to the elastic washer, once the nut has been tightened, the axial load of the threaded shank in the nut remains despite the deformation of the two components or the elongation of the shank. As a result, this axial load makes it possible to increase the forces of friction of the threaded shank inside the nut thereby, in particular, lessening the risks of unscrewing.

However, for certain types of assembly it is necessary to impart a determined axial tension to the threaded shank. In order to do this, use is usually made of a torque wrench. That tool nevertheless requires a certain degree of skill and practice in order to be able to perfectly control the tension imparted into the shank.

Furthermore, tightening a nut and a screw through two assembled components gives rise to torsion loadings in the threaded shank and also to surface deformation on said components. Specifically, the tightening of the nut may in particular tend to make the elastic washer and/or the head rub against the component against which it bears.

So, one problem that presents itself and that the present invention aims to overcome, is that of providing a deformable screw assembly which not only allows a determined axial tension to be imparted easily to the assembly through which it passes but which also makes it possible to preserve the condition of the surfaces against which it presses.

To this end, the present invention proposes a deformable screw assembly intended to apply load between two elements in two opposite directions to one another, said screw assembly comprising, on the one hand, a longitudinal component having two opposite ends and a threaded part extending between said two opposite ends so that it can be connected by screwing to one of said two elements and, on the other hand, an elastically deformable member intended to be borne in the axially compressed state between one or other of said two opposite ends of said longitudinal component and the other of said two elements, whereas said threaded part is under axial strain. Said elastically deformable member comprises an elastic washer; and said screw assembly further comprises a retaining device so as to be able to keep said elastic washer under axial compression and so as to be able to release said elastic washer in said compressed state between said other of said two elements and said one or said other of said two opposite ends of said longitudinal component.

Thus, one feature of the invention lies in the use of a temporary retaining device allowing the elastically deformable member, namely the elastic washer, to be kept in axial compression during assembly of the two elements and at least partial tightening of the longitudinal component. In other words, the elastically deformable member is kept in compression before said threaded part is brought under axial strain. Next, by actuating the retaining device and releasing the elastically deformable member, the latter will impart axial tension to the longitudinal component, without the surfaces of the two assembled elements becoming damaged, as will be explained in greater detail further on in the description. What is more, by virtue of the temporary retaining device, it is easy to impart axial strain of predetermined magnitude to the elastically deformable member and then to release this elastically deformable member so that it can apply this axial tension to the longitudinal component. As a result, there is absolutely no need to have a tool of the torque wrench type to hand, it is simply necessary to envision mounting the elastically deformable member at the required pressure right from the time of manufacture of the screw assembly.

The elastic washer is, for example, a conical washer or indeed alternatively a spherical washer. Furthermore, under certain circumstances, as will be explained hereinafter, it is advantageous to use at least one second elastic washer.

In terms of the retaining device, this preferably comprises a tapped component, whereas said elastic washer has a threaded circular edge so as to be able to come into engagement inside said tapped component. In that way, the elastic washer is kept under axial compression via its periphery, thereby making it possible easily to disengage the retaining device after use of the longitudinal component through the two elements.

According to a first alternative form of embodiment of the invention, said elastically deformable member further comprises another washer having another threaded edge so as to be able to come into engagement inside said tapped component, and said elastic washer is able to be kept under axial compression against said other washer inside said tapped component. Thus, for example, a conical elastic washer is pressed against another, flat, washer, so that the internal margin of the conical washer presses against the flat washer, and the forcible tightening of the conical washer and of the flat washer against one another causes the conical washer to deform against the flat washer, thereby tensioning it.

According to one particularly advantageous embodiment of the invention, said other washer is a conical washer. Thus, when just two conical washers are used, these are advantageously placed in opposition to one another, with the smallest-diameter edges pressing against one another. In that way, the amplitude of possible deformation is doubled, while at the same time maintaining the same stiffness.

According to one alternative form of embodiment, said elastic washer has a U-shaped radial cross section with the opening of the U facing away from the center of said elastic washer, thereby forming two parallel circular edges, or lips. Such a washer offers the advantage of forming two circular bearing margins symmetrical to one another with respect to a plane of symmetry perpendicular to the axis of the washer.

According to one particular embodiment of the invention, said one of said two ends has a head forming a shoulder. The shoulder thus forms a circular bearing surface. Also, for preference, said elastically deformable member is able to come to bear against said shoulder. According to one particular embodiment, the tapped component of the retaining device has a bottom able to come to bear axially against the head on the opposite side to the shoulder. In that way, the turning of the retaining device, inside which the threaded edge of the elastic washer is engaged, makes it possible to deform the elastic washer which then has a tendency to press flat against the shoulder.

According to a second alternative form of embodiment of the invention, said retaining device comprises an operating shank passing axially through said threaded part, said operating shank having a first end intended to collaborate with said other of said two ends of said threaded part so as to be able to keep said elastically deformable member under axial compression. The operating shank is mounted with the ability to move translationally inside the threaded part. Also, the elastic washer is pressed against the edge of said other of said two ends of said threaded part through which said first end passes. Further, the elastic washer is halted by an elastic ring of the circlip type for example. Thus, the operating shank can be driven under force into the threaded part, while the elastic washer deforms and in return applies a return force.

Furthermore, according to this second alternative form, advantageously said operating shank has a second end at the opposite end to said first end, said second end being intended to collaborate with said one of said two ends of said threaded part between a first angular position in which said elastically deformable member is kept in axial compression and a second angular position in which said elastically deformable member is released in said compressed state. The second end thus collaborates with said one of said two ends of said threaded part and, through a ramp effect, allow the translational movement of the operating shank inside the threaded part so as to be able to keep the elastic washer under compression.

According to one embodiment of the invention, the threaded part is engaged with one of the two elements, whereas the first end of said operating shank, which has a free bearing surface, is able to come to bear axially against said other of the two elements.

According to another embodiment of the invention, the threaded part is also in engagement with one of the two elements, whereas the second end of the operating shank has a head forming a shoulder able to come to bear against said other of the two elements.

Advantageously, the screw assembly further comprises a nut able to engage with said threaded part so as to be able to come to bear against said one of said two elements.

BRIEF DESCRIPTION OF THE DRAWINGS

Further specifics and advantages of the invention will become apparent from reading the description hereinafter of some particular embodiments of the invention, these being given by way of nonlimiting indication with reference to the attached drawings in which.

DETAILED DESCRIPTION OF THE PREFERRED EMBODIMENTS

Figures 1, 2, 3:
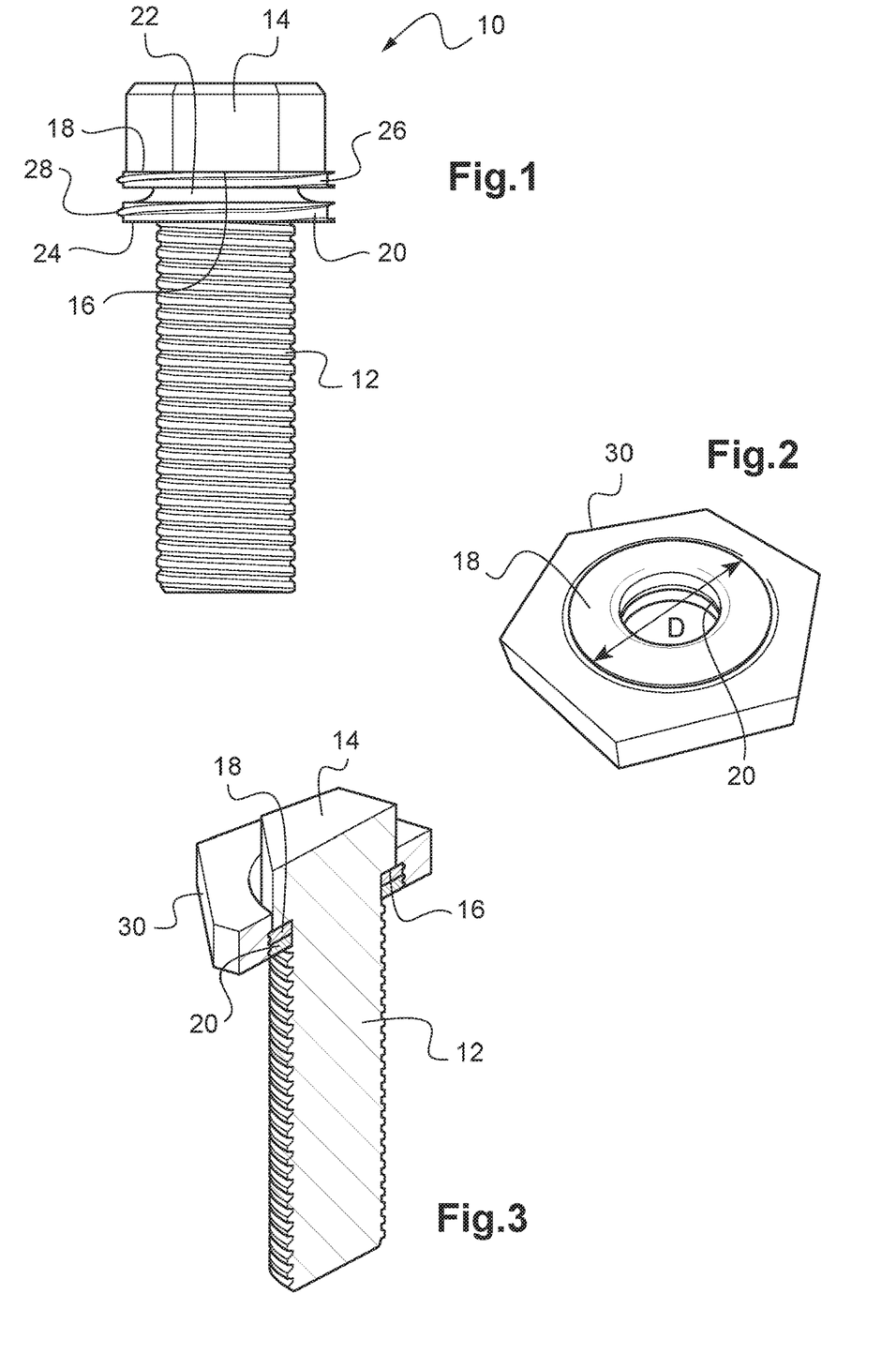
FIG. 1 is a partial schematic view in side elevation of a deformable screw assembly according to the invention according to a first alternative form of embodiment.
FIG. 2 is a partial schematic view in perspective from above of the deformable screw assembly according to the invention according to the first alternative form of embodiment.
FIG. 3 is a schematic view in axial section of the deformable screw assembly according to the invention according to the first alternative form of embodiment.

FIG. 1 illustrates in side elevation a screw 10 comprising a threaded part 12 forming a shank and, at one of its ends, a head 14 forming a shoulder 16. Furthermore, a flat washer 18 is depicted in FIG. 1 resting against the shoulder 16 whereas a conical washer 20 comes into contact with the flat washer 18. As will be explained later on in the description, use of two conical washers is also envisioned according to another embodiment.

The washers 18, 20 are made of metal. The conical washer 20 has an internal margin 22 situated toward the center opposite to an external margin 24 situated at the periphery. The flat washer 18 has a first threaded edge 26 of opposite hand to the threaded part 12 of the screw 10, whereas the conical washer 20 has a second threaded edge 28, likewise of opposite hand to the threaded part 12.

Unlike the deformable screw assemblies according to the prior art in which the elastic washers are compressed as the screw is gradually tightened, according to the invention, the conical washer 20 is prestressed against the flat washer 18 inside a tapped component 30 formed of a large-sized flat hexagon nut depicted in FIG. 2. The flat nut 30 has a diameter D greater than the maximum diameter of the head 14 of the screw 10 depicted in FIG. 1. The first threaded edge 26 of the flat washer 18 and the second threaded edge 28 of the conical washer 20 are thus respectively engaged in the tapping of the flat nut 30. The conical washer 20 is thus forcibly deformed by a predetermined amount of strain, against the flat washer 18. An installation that allows the two washers to be installed inside the flat nut will be described in greater detail later on in the description.

It will be seen that the flat nut 30 and its two washers, flat 18 and conical 20, may thus be mounted so that they can be used later without the axial tension in the conical washer 20 being in any way diminished as a result.

The threaded part 12 of the screw 10 can thus be engaged inside the washers 18, 20, through the flat nut 30, as illustrated in FIG. 3. This FIG. 3 again shows the flat 18 and elastic 20 washers engaged against one another inside the flat nut 30, the flat washer 18 pressing against the shoulder 16 of the head 14. The threaded part 12 therefore passes through the washers 18, 20 and the flat nut 30.

Figures 4, 5, 6, 7:
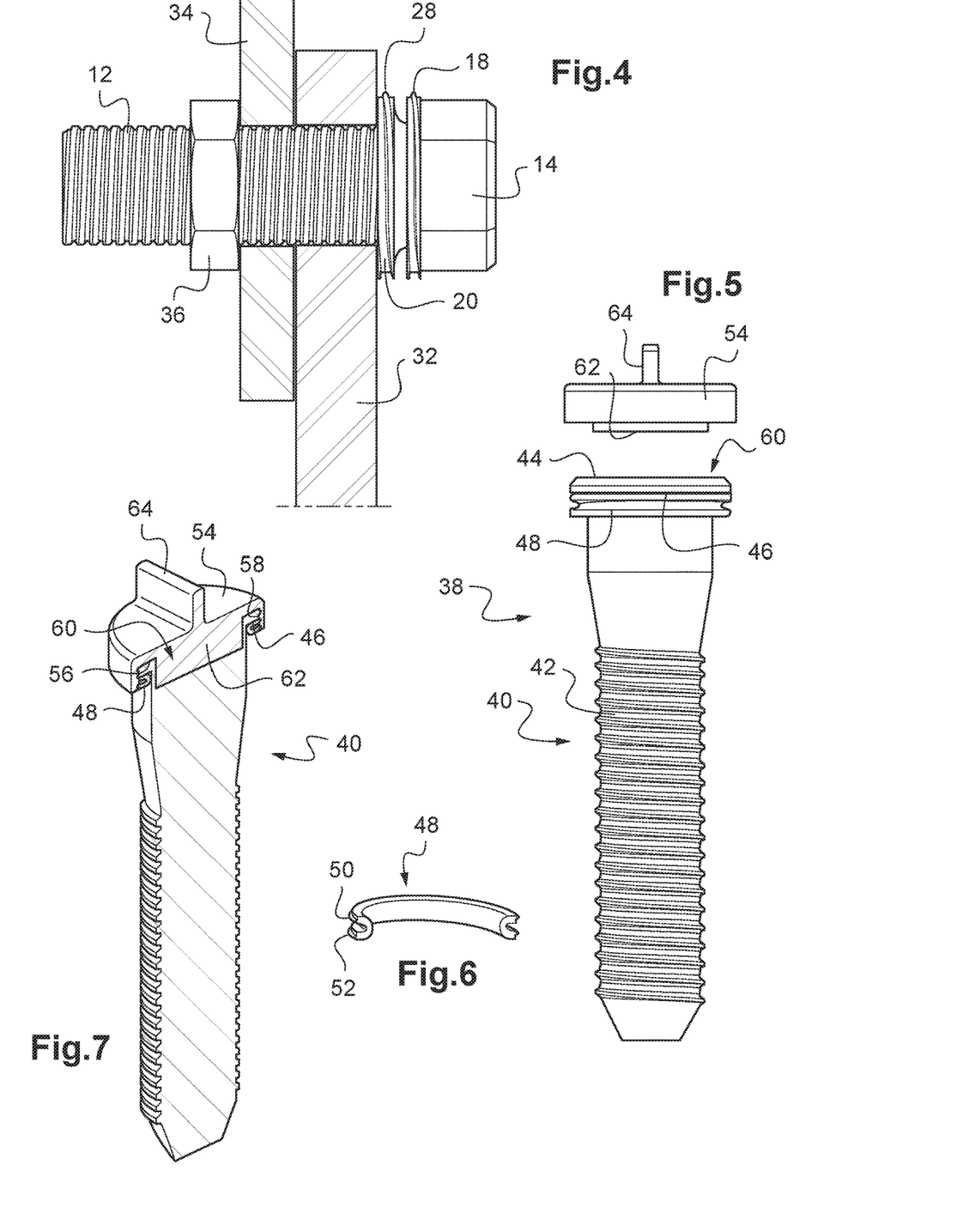
FIG. 4 is a schematic view in side elevation of the deformable screw assembly used according to the invention.
FIG. 5 is a schematic view in side elevation of a deformable screw assembly according to a second alternative form of embodiment.
FIG. 6 is a perspective sectioned schematic figure of an element of the deformable screw assembly depicted in FIG. 5.
FIG. 7 is a schematic view in axial section of the deformable screw assembly according to the second alternative form of embodiment.

This threaded part 12 is then engaged through two superposed and holed plates 32, 34 as illustrated in FIG. 4. The threaded part 12 is then fitted with a nut 36 and the latter is screwed by hand until it comes into contact with the thin plate 34. The conical washer 20 that has been flattened and preloaded against the flat washer 18 by the flat nut 30 is then pressing against the surface of the thick plate 32. As a result, if the flat nut 30 is unscrewed while the head 14 passes through it, the second threaded edge 28 of the conical washer 20 is then released. The conical washer 20 then tends to relax and revert to its initial conical shape. In so doing its external margin 24 will press against the surface of the thick plate 32, while the opposite internal margin bears against the flat washer 18, thereby applying tension to the threaded part 12 between the nut 36 and the head 14.

This tension is predefined by the axial strain imparted initially to the conical washer 20 inside the flat nut 30 against the flat washer 18.

Also, it has been possible to impart the axial tension to the threaded part 12 without any need to turn the nut 36 against the surface of the thin plate 34. As a result, the threaded part 12 has experienced no torsional strain, which tends to reduce the loadings to which it is subjected and, what is more, the surface of the thin plate 34 has not been damaged.

For example, the conical washer 20 is thus preloaded by 40000 Newton, and this strain is not released until after the screw assembly 10 has been introduced through the two plates 34, 32.

Also, the conical washer 20 remains under strain and can further relax axially by a certain amount, without the tension it is able to obtain being substantially affected as a result. As a result, when one of the plates 32, 34 is, for example, made of a composite material, which may have a tendency to creep over time, thanks to the reserve of potential energy contained in the conical washer 20, the latter can relax substantially maintaining tension in the threaded part 12.

Thus, the deformable screw assembly according to the invention allows potential energy to be stored in a set of washers, and allows the ability for this energy to be at least partially released after the screw assembly has been installed.

It will also be noted that the flat nut 30 equipped with the washers which have been preloaded to a predetermined amount of tension can be stored for later use. Thus, a given tension can be applied to a screwed assembly without there being any need in order to do so to use measurement tools such as a torque wrench.

Reference is now made to FIGS. 5 to 7 which illustrate a deformable screw assembly 38 according to a second alternative form of embodiment. This has a screw 40 with a threaded shank 42 surmounted by a head 44 leaving a shoulder 46. An elastic washer 48 with a U-shaped radial section with the open side of the U facing outwards, presses against the shoulder 46. The elastic washer 46 can be seen again in greater detail in FIG. 6, in this instance sectioned. The elastic washer 48 is made of metal and defines two parallel lips, an upper lip 50 and a lower lip 52. The two lips are then threaded with the opposite hand to the threaded shank 42 and in such a way that they can be screwed into a tapped cap 54 depicted in FIGS. 5 and 7. The tapped cap 54 has a bottom 56 intended to bear against the head 44 on the opposite side to the shoulder 46, and an interior tapping 58. What is more, the head 44 has a circular axial housing 60 inside which a guide disk 62 secured to the bottom 56 of the tapped cap 54 can be guided in rotation. The guide disk extends coaxially as a projection from the tapped cap 54 and, on the opposite side, the latter is equipped with a driving tongue 64.

Thus, FIG. 7 illustrates the tapped cap 54 mounted on the head 44, the guide disk 62 engaged inside the circular axial housing 60, the bottom 56 bearing axially against the head 44, while the elastic washer 48 of U-shaped cross section is held in compression against the shoulder 46, its threaded lips being engaged in the internal tapping 58. The compression of the elastic washer 48 was able to be achieved by forcibly driving the tapped cap 54 with respect to the screw 40, using the tongue 64.

In that way, just as in the first alternative form of execution, mounting the screw 40 through a holed assembly and using a nut allows axial strain to be imparted to the shank 42 between the nut and the head 44 by unscrewing the tapped cap 54 so as to release the elastic washer 48.

Figure 8:
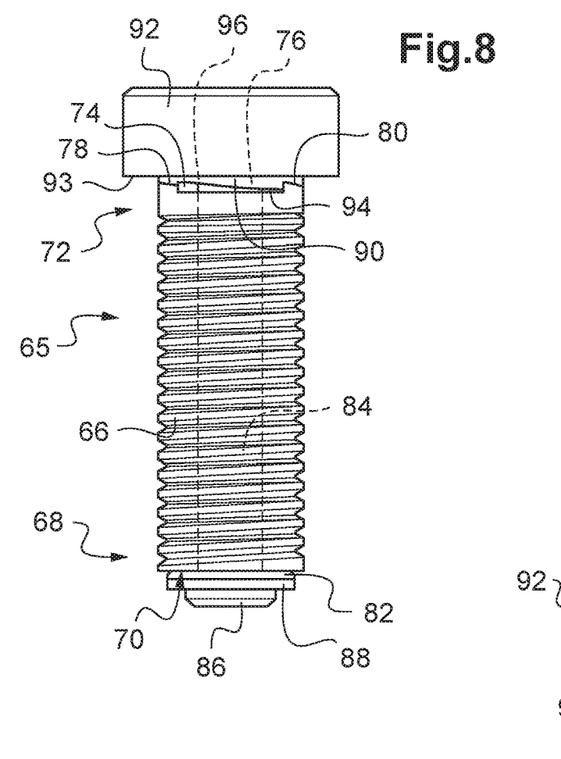
FIG. 8 is a schematic view in front elevation showing a deformable screw assembly according to a third alternative form of embodiment, in a first state.
Figure 9:
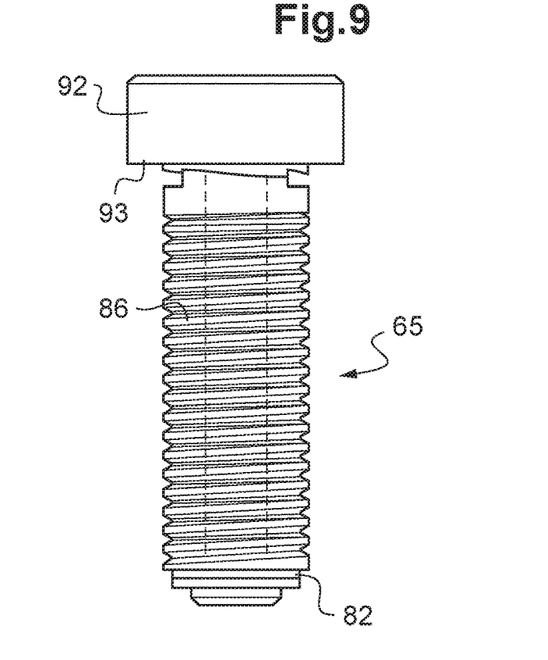
FIG. 9 is a schematic view in front elevation of the deformable screw according to a the third alternative form of embodiment, in a second state.

Reference will now be made to FIGS. 8 and 9 which illustrate a third alternative form of embodiment. FIG. 8 shows a deformable screw assembly 65 comprising a hollow threaded part 66 having a first end 68 that defines a circular axial bearing edge 70 and a second end 72 having two diametrically opposed circular cutouts 74, 76 and, between them, two arcuate edges forming ramps 78, 80. At the first end 68, a conical elastic washer 82 is pressed against the circular axial bearing edge 70. It is kept pressed there by a retaining device comprising an operating shank 84 extending axially inside the hollow threaded part 66, the operating shank 84 having, on the one hand, a stop end 86 equipped with an elastic ring 88 bearing axially against the conical elastic washer 82 and, on the other hand, at the opposite end, a square-tooth operating end 90 bearing against the ramp-forming edges 78, 80. The square-tooth operating end 90 is also surmounted by a driving head 92 defining a shoulder 93. The square-tooth operating end 90 has two diametrically opposed square teeth 94, 96 cut to a chamfer to form ramps likewise, and extending respectively into the circular cutouts 74, 76.

In that way, the driving head 92 can be turned with respect to the hollow threaded part 66 through a quarter-turn while the square teeth 94, 96 collaborate with the ramp-forming edges 78, 80 so as to separate the driving head 92 from the second end 72 of the hollow threaded part 66 thereby driving the operating shank 84 translationally. In that way, the stop end 86 has a tendency to retract toward the inside of the hollow threaded part 66 and, as a result, compresses the conical elastic washer 82 via the elastic ring 88. The conical elastic washer 82 thus compressed can be seen again in FIG. 9.

This FIG. 9 again shows all the other elements of the deformable screw assembly 65 which can then be engaged, for example through an assembly of two plates as depicted in FIG. 4. A nut is then screwed onto the hollow threaded part 66 so that it comes into contact with one of the plates, while the shoulder 93 presses against the other plate. The driving head 92 is then turned in the opposite direction and through a quarter-turn so as to be able to release the operating shank 84 and, as a result, the conical elastic washer 82. As a result, the nut, not depicted, bears against said one of the plates while the driving head 92 bears against the other of said plates and the hollow threaded part 66 is under axial tension between the nut and the driving head 92.

For the deformable screw assembly 65 to operate correctly, care will be taken to ensure that friction between the square teeth 94, 96 collaborating with the ramp-forming edges 78, 80 is relatively small in comparison with the initial clamping of the plates between the nut and the driving head 92.

According to another embodiment according to the third alternative form of embodiment depicted in FIG. 9, and in which the same elements having the same functions have the same references followed by a "'" symbol.

Figure 10:
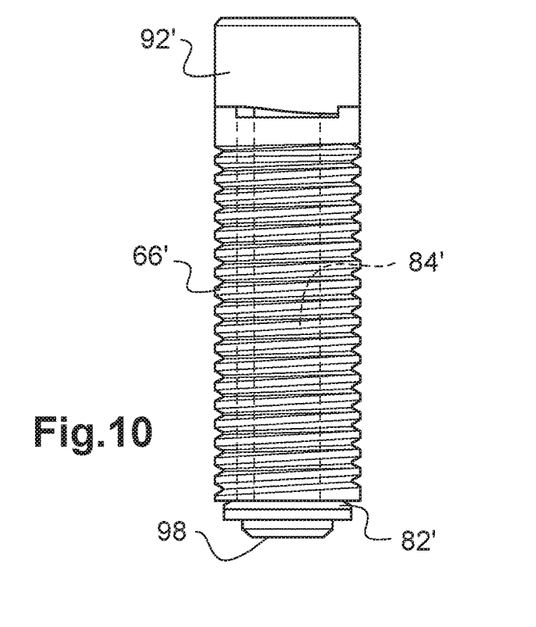
FIG. 10 is a schematic view in side elevation of a deformable screw according to the third alternative form of embodiment according to another use.

Thus, once again, there is the hollow threaded part 66' through which the operating shank 84' passes so that the compression of the conical elastic washer 82' can be brought about by turning the driving head 92'. Unlike in the previous embodiment, the driving head 92' has no shoulder. By contrast, it is the free end 98 of the operating shank 84' that is intended to bear against one of the elements while the nut, not depicted, is able to be screwed around the hollow threaded part 66' to come to bear against the other element.

Figure 11:
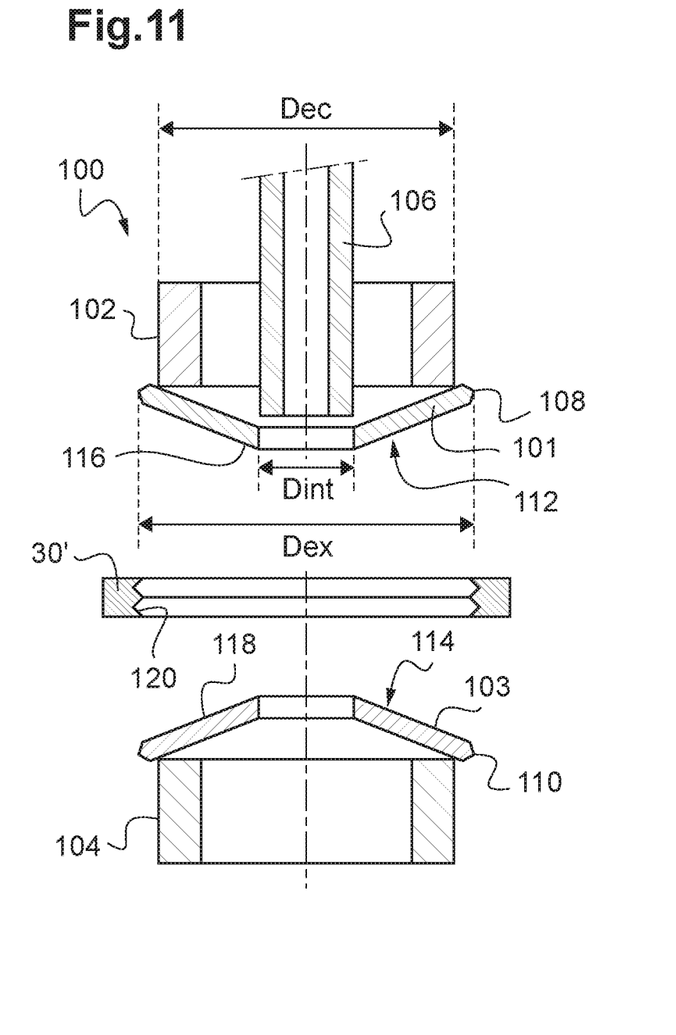
FIG. 11 is a schematic view in axial section of an installation making it possible to obtain the object depicted in FIG. 2.

Reference will now be made to FIG. 11 which schematically shows an installation 100 that allows two washers to be installed inside a flat nut, according to the invention and according to one particular embodiment.

According to this particular embodiment, a first conical washer 101 and a second conical washer 103 are installed inside a flat nut 30'.

Thus, the installation 100 comprises two coaxial tools, an upper one 102, and a lower one 104, forming collars, mounted with the ability to move translationally toward one another. Also, it also comprises a center punch 106 able to pass coaxially through the upper coaxial tool 102 and the lower coaxial tool 104.

The two conical washers 101, 103 are identical and have an outside diameter Dex, and an inside diameter Dint. Their exterior edges respectively have a first screw thread 108 and a second screw thread 110. They also respectively have a first convex face 112 and a second convex face 114. On these convex faces 112, 114 they have a first interior margin 116 and a second interior margin 118.

As for the flat nut 30', this has a tapping 120 the diameter of which is appreciably greater than the outside diameter Dex of the conical washers 101, 103. It will also be seen that the outside diameter of the coaxial collar-forming tools 102, 104 is substantially less than the outside diameter Dex of the conical washers 101, 103 and, in addition, that the outside diameter of the center punch 106 is substantially equal to the inside diameter Dint of the washers, so that it can be engaged therein.

Thus, the flat nut 30' is interposed coaxially between the two coaxial tools 102, 104, whereas the first conical washer 101 is installed between the upper tool 102 and the flat nut 30' and the second conical washer 103 between the lower tool 104 and the flat nut 30' so that the conical washers 100, 103 are arranged with their convex faces 112, 114 facing one another through the flat nut 30'.

In order to keep the conical washers 101, 103 coaxial, the center punch 106 is then engaged through them and the flat nut 30' as far as the lower tool 104.

Next, the first 116 and second 118 interior margins come into contact with one another through the flat nut 30'. The two coaxial tools 102, 104 are then forcibly driven toward one another so as to deform the conical washers 101, 103 as far as flattening them. Their exterior edges then become contiguous and the first 108 and second 110 screw threads are close enough together and in the continuity of one another that the conical washers 101, 103 can then be screwed, together, into the flat nut 30'. The conical washers 101, 103 are thus elastically deformed and kept under strain inside the flat nut 30'.

The invention claimed is:

1. A deformable screw assembly adapted to apply load between two elements in two opposite directions to one another, said screw assembly comprising a longitudinal component having two opposite ends and a threaded part extending between said two opposite ends so that said longitudinal component is connected by screwing to one of said two elements; and an elastically deformable member adapted to be borne in an axially compressed state between one or other of said two opposite ends of said longitudinal component and the other of said two elements, said threaded part being under axial strain;

wherein said elastically deformable member comprises an elastic washer;

wherein said screw assembly comprises a retaining device to keep said elastic washer under axial compression and to release said elastic washer in said compressed state between said other of said two elements and said one or said other of said two opposite ends of said longitudinal component;

wherein said retaining device comprises a tapped component, and said elastic washer has a threaded circular edge to come into engagement inside said tapped component; and wherein said elastically deformable member further comprises another washer having another threaded edge to come into engagement inside said tapped component, and wherein said elastic washer is kept under axial compression against said other washer inside said tapped component.

2. The screw assembly as claimed in claim 1, wherein said other washer is a conical washer.

3. The screw assembly as claimed in claim 1, wherein said elastic washer has a U-shaped radial cross section with the opening of the U facing away from a center of said elastic washer, thereby forming two parallel circular edges.

4. The screw assembly as claimed in claim 1, wherein said one of said two ends has a head forming a shoulder.

5. The screw assembly as claimed in claim 4, wherein said elastically deformable member bears against said shoulder.

6. The screw assembly as claimed in claim 1, further comprising a nut able to engage with said threaded part to come to bear against said one of said two elements.

7. A deformable screw assembly adapted to apply load between two elements in two opposite directions to one another, said screw assembly comprising:

a longitudinal component having two opposite ends and a threaded part extending between said two opposite ends so that said longitudinal component is connected by screwing to one of said two elements; and an elastically deformable member adapted to be borne in an axially compressed state between one or an other of said two opposite ends of said longitudinal component and the other of said two elements, said threaded part being under axial strain;

wherein said elastically deformable member comprises an elastic washer;

wherein said screw assembly comprises a retaining device to keep said elastic washer under axial compression and to release said elastic washer in said compressed state between said other of said two elements and said one or said other of said two opposite ends of said longitudinal component; and wherein said retaining device comprises an operating shank passing axially through said threaded part, said operating shank having a first end adapted to collaborate with said other of said two ends of said threaded part so as to be able to keep said elastically deformable member under axial compression.

8. The screw assembly as claimed in claim 7, wherein said operating shank has a second end at the opposite end to said first end, said second end being adapted to collaborate with said one of said two ends of said threaded part between a first angular position in which said elastically deformable member is kept in axial compression and a second angular position in which said elastically deformable member is released in said compressed state.

* * * * *